(No Model.)
J. A. SPOONER.
PEDAL BAR.
No. 577,791. Patented Feb. 23, 1897.
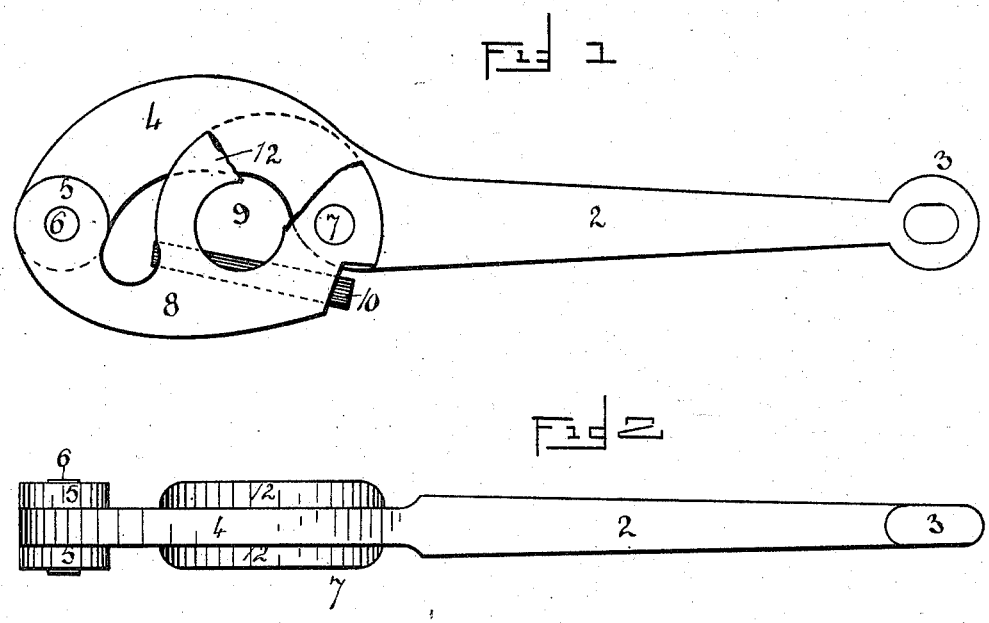
WITNESSES:
G. W. Paddock
H. Hoescher
INVENTOR
John A. Spooner
BY
ATTORNEY.

UNITED STATES PATENT OFFICE.

JOHN A. SPOONER, OF OMAHA, NEBRASKA.

PEDAL-BAR.

SPECIFICATION forming part of Letters Patent No. 577,791, dated February 23, 1897.

Application filed March 6, 1896. Serial No. 582,025. (No model.)

*To all whom it may concern:*

Be it known that I, JOHN A. SPOONER, residing at Omaha, in the county of Douglas and State of Nebraska, have invented certain useful Improvements in Pedal-Bars; and I do hereby declare that the following is a full, clear, and exact description of the invention, such as will enable others skilled in the art to which it appertains to make and use the same, reference being had to the accompanying drawings, which form a part of this specification.

This invention relates to an improvement in pedal-bars more especially adapted to be used in conjunction with bicycles.

The object of my invention is to provide a two-part pedal-bar that shall be readily attached and removable, as will be described more fully hereinafter.

In the accompanying drawings, Figure 1 shows a side view, with a portion broken away, of a pedal-bar embodying my invention, while Fig. 2 shows a top view thereof.

My invention comprises, essentially, a bar 2, of any suitable size or material, which is provided in front with a pedal-ear 3 and at the opposite end with an outwardly-curved extension 4, the termination being provided with a circular opening adapted to receive the pin 6, as is shown in Fig. 1. This semicircular extension is preferably slightly less in diameter than the bar portion 2. Movably secured to the end of the curved extension 4 is a holder having a bifurcated ear 5, adapted to receive the curved extension, and being further provided with a transverse opening 9, adapted to receive the main driving-shaft, an opening extending at right angles and partly passing through said opening 9, which latter opening is shown in dotted lines and is adapted to receive the cotter-pin 10, this holder comprising the bar 8, in conformation resembling the figure 6, the holder being secured at both ends to the bar 2, the curved portion 12 being provided with an opening adapted to receive the pin 7, as is shown in Fig. 1.

It should be mentioned that the pedal-opening within the ear 3, the pin 6, the shaft-opening 9, and the pin 7 are in one line. The main driving-shaft is held solely by the holder 8 and works within the curve 4, as is shown in Fig. 1. The main pedal-bar 2 can be readily removed from the holder 8 without detaching the same from the main driving-shaft, and in fact the main driving-shaft could be provided with a disk adapted to receive the pin 7 and an ear adapted to receive the curved end 4, in which modification of course the cotter-pin 10 and the opening 9 would be unnecessary. By means of this lever arrangement a powerful pedal-bar is obtained which can be readily detached from the main shaft.

Now, having thus described my said invention, what I claim as new, and desire to secure by United States Letters Patent, is—

1. In a pedal-bar the combination of a main stem, said stem being provided at one end with an opening adapted to receive the pedal, the remaining end being curved outwardly in a direction at right angles to the axis of the pedal, and a holder, said holder being approximately C-shaped and secured at both ends to the curved end of said pedal-bar, said holder being provided with an opening adapted to receive the propelling-axle of a bicycle, substantially as and for the purpose set forth.

2. In a two-part pedal-bar the combination of a main stem 2 having openings at each end, one end 4 further being curved, and a curved holder 8 adapted to receive a shaft and the pins 6 and 7 all substantially as and for the purpose set forth.

In testimony whereof I affix my signature in presence of two witnesses.

JOHN A. SPOONER.

Witnesses:
WM. A. WEBSTER,
G. W. SUES.